3,446,082
DOUBLE ROTOR PNEUMATIC GYROSCOPE
Gerald B. Speen and Richard C. Turnblade, Northridge, Calif., assignors to International Telephone and Telegraph Corporation, Nutley, N.J., a corporation of Maryland
Filed Mar. 4, 1966, Ser. No. 531,707
Int. Cl. G01c 19/20
U.S. Cl. 74—5.12                                              6 Claims

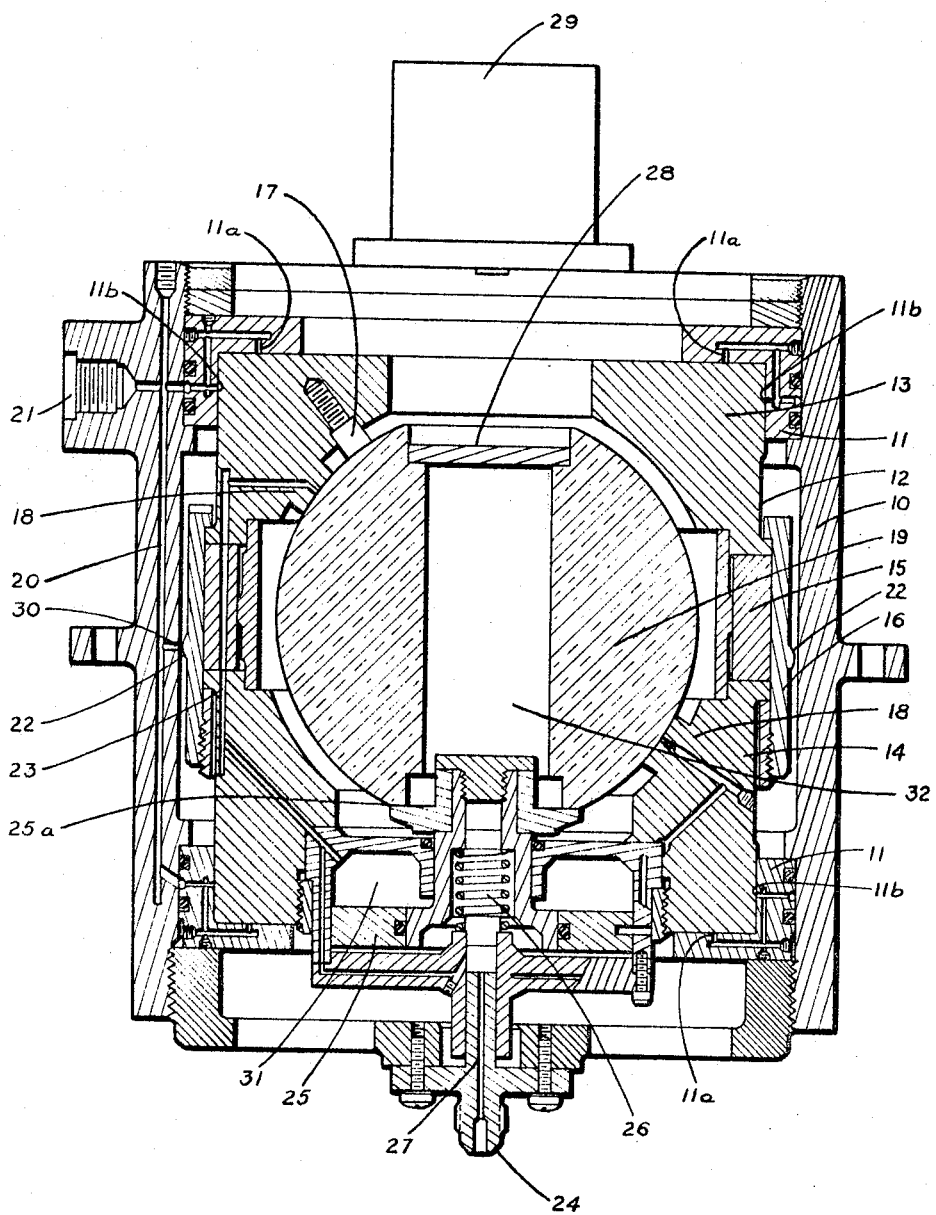

ABSTRACT OF THE DISCLOSURE

A peumatically operated gyroscope having its rotor supported within a rotor case by gas bearing pads, the rotor case further being supported within a frame by gas bearings such that when the rotor case is rotated, it will tend to cause the rotor to rotate along with it. Pneumatic power is employed throughout, including the use thereof for rotating the rotor case.

---

This invention relates to a gas lubricated and powered gyroscope and more particularly to one having a double rotor.

In U.S. Patent No. 2,940,318 a gyroscope is disclosed having a spherical rotor disposed within a frame, also of substantially spherical configuration, and supported by a plurality of gas bearing pads. The frame is mounted in mechanical bearings on a platform and spun by some external driving mechanism such as an electric motor, while a pressurized gas is fed through the frame supporting bearings to the gas bearing pads to support the rotor with a minimum of friction. The spinning frame causes the rotor also to spin, and eventually achieve a speed sychronous with the frame.

In the present invention a bearing system similar to that used to support the rotor is also used to support the rotating frame. Here the rotating frame itself adds to the gyro effect as a whole.

Accordingly, it is an object of this invention to provide a gyroscope having a rotor which is pneumatically supported within a rotating frame which is also pneumatically supported.

Briefly, the invention provides a pneumatically operated gyroscope having a rotor disposed within a rotor case and supported therein by gas bearing pads, the rotor case further being supported within gas bearings in a frame, such that when the rotor case is rotated it will tend to cause the rotor to rotate along with it. Pneumatic power is employed to rotate the rotor case as well as to pneumatically support both the rotor and the rotor case.

A feature of this invention is a pneumatically operated caging mechanism which causes a caging ring to contact the rotor of the gyroscope and bring it to a stop when there is insufficient gas pressure, so that the rotor will not bear against the gas bearing pads of the rotating case.

The above-mentioned and other features and objects of this invention will become more apparent by reference to the following description taken in conjunction with the accompanying drawing which is a sectional view in elevation illustrating an embodiment of the invention.

In the illustration the gyroscope comprises an outer case 10 having disposed therein a pair of ring-type integral journal-thrust support bearings 11, one at each end. Mounted within support bearings 11 is a rotor case 12 made in three sections: an upper end member 13, a lower end member 14 and a center member 15, with a clamping ring 16 being employed to hold the three-member rotor case together. Thus the rotor case has a substantially cylindrical outer configuration. The upper end member 13 contains three caging plugs 17 and three gas bearing pads 18 equally spaced thereabout, only one each being shown. The bottom end member 14 also contains three gas bearing pads 18. A rotor 19 is disposed within rotor case 12. A gas bearing system is used to support rotor 19 during operation and includes the six gas lubricated, gas bearing pads 18. The gas bearing pads 18 are arranged in three pairs, each pair composed of two diametrically opposed pads. The axis of each pair is perpendicular to the axes of the other two pairs so that the pairs lie on a rectangular coordinate system. This specific configuration is preferred because it provides an isoelastic support with the fewest number of pads. The support bearings 11 for the rotor case are externally pressurized and provide both radial and axial support therefore as indicated by axially disposed jets 11a and (radially) disposed jets 11b. Pressure is derived from a manifold system 20 having an inlet 21 to which pressurized gas is supplied. Nozzles 30 are provided on manifold system 20 to supply jets of gas for causing rotation of rotor case 12, the jets of gas being directed against buckets or notches 22 which are arranged about clamping ring 16, this method being only exemplary of known methods for spinning a member pneumatically. Pressurized gas is supplied to gas bearing pads 18 via a manifold system 23 from a gas transfer device 24.

A pneumatically operated caging mechanism is located in the lower half of rotor case 12. This device contains a spring loaded piston 25 which is operated in conjunction with the three caging plugs 17, located in the opposite end of rotor case 12, to hold rotor 19 clear of the bearing pads 18 when the gas pressure is cut off. Caging plugs 17 are made slightly longer than gas bearing pads 18 so that the rotor never touches the surface of the upper gas bearing pads even when the rotor is caged. When gas is supplied to gas transfer device 24 the piston 25 is caused to move away from rotor 19 against the force exerted by the spring 26. When insufficient gas pressure exists the spring 26 forces piston 25 upward so that annular surface 25a engages the rotor 19 and holds it against the caging plugs 17. The force of the spring 26 is so adjusted that adequate gas pressure must be established in the gas bearing pads 18 to support rotor 19 before the rotor is released. If pressure is lost, the gyro is automatically caged prior to loss of supporting gas so that the rotor and the bearing pads are protected.

Gas transfer device 24 is used to inject pressurized gas into the rotating portion of the gyroscope. In the illustration it is simply a tube 27 extending into a hole in the caging mechanism. Gas from gas transfer device 24 pressurizes the chamber 31 in the caging mechanism. The high pressure gas from the tube 27 also supplies the pads 18 in the rotor case through the internal manifold system 23.

Gyroscope operation is commenced by applying gas to inlet 21 in the stationary outer case 10. This activates the integral support bearings 11 so that rotor case 12 is supported on a film of gas. Simultaneously, gas is directed through jets 30 against buckets 22 provided in the clamping ring 16. This causes the rotor case to rotate to a predetermined operating speed and also carry rotor 19 at the same rotating speed. After the desired rotational speed is attained, gas is supplied to gas transfer device 24. This gas enters the caging mechanism, fills the chamber 31, and flows through the internal manifolding system 23 to the six gas bearing pads 18. When the preset pressure is reached in chamber 31, piston 25 in the caging assembly retracts. As the caging mechanism retracts, rotor 19 is floated on a film of gas in the bearing pads 18. It should be noted that pressure sufficient to support rotor 19 is attained in the gas bearing pads 18 prior to uncaging by selecting the proper spring force for spring 26.

When the pressure exceeds the pre-set level, piston 25 withdraws from rotor 19. At this point, rotor 19 is rotating in synchronism with rotor case 12 and the two spin axes are coincident. Because the entire system is rotating, there is no cause for the rotating sphere 19 to slow down and, therefore, approximately synchronous speed is maintained at all times. A hole 32 can be drilled in rotor 19 to give it a preferred axis of rotation.

If rotor case 12 is caused to move angularly with respect to rotor 19 about any axis perpendicular to the spin axes, such an angular misalignment can be detected by observing a mirror surface 28 on the sphere 19 with an optical pickoff 29.

While we have described above the principles of our invention, in connection with specific apparatus, it is to be clearly understood that the specification is presented by way of example and not as a limitation on the scope of our invention, as set forth in the accompanying claims.

We claim:

1. In a pneumatically operated gyroscope:
   a frame;
   a pair of pneumatic support bearings mounted in said frame;
   a rotor case arranged in said support bearings for movement therein;
   a rotor;
   means supporting said rotor for relative movement in said rotor case and for movement therewith;
   means to supply a pressurized gas to said support bearings; and
   means to drive said rotor case for rotation in said support bearings.

2. A pneumatically operated gyroscope as defined in claim 1 wherein said rotor supporting means includes a plurality of gas bearing pads and means to supply gas to said pads to form a film of gas between said gas bearing pads and said rotor.

3. A pneumatically operated gyroscope as defined in claim 2 further including at least one caging plug and a caging mechanism to maintain said rotor against said caging plug when insufficient gas pressure is supplied to said gas bearing pads to float said rotor.

4. A pneumatically operated gyroscope as defined in claim 3 wherein said caging mechanism includes a caging piston to contact said rotor when insufficient gas pressure exists, means to cause said caging piston to be withdrawn from said rotor when gas pressure increases, and means responsive to a drop in gas pressure to cause said caging piston to contact said rotor and thus cause said rotor to contact said caging plug before the gas pressure drops to a point removing the film of gas between said rotor and said gas bearing pads.

5. A pneumatically operated gyroscope as defined in claim 4 in which said means to cause said caging piston to contact said rotor includes a preloaded spring.

6. A pneumatically operated gyroscope as defined in claim 5 in which said means to cause withdrawal of said caging piston includes means to introduce a pressurized gas against said piston to compress said preloaded spring.

References Cited

UNITED STATES PATENTS

| | | | |
|---|---|---|---|
| 1,984,874 | 12/1934 | Gillmor et al. | 33—204.2 |
| 1,996,896 | 4/1935 | Bennett | 74—5.14 X |
| 2,273,309 | 2/1942 | Zand | 74—5.14 |
| 3,043,635 | 7/1962 | Bard | 74—5.7 X |
| 3,186,241 | 6/1965 | Blanding et al. | 74—5.7 X |
| 3,187,588 | 6/1965 | Parker | 74—5.6 X |
| 3,252,340 | 5/1966 | Watt | 74—5.7 X |
| 3,287,982 | 11/1966 | Hayner et al. | 74—5.7 |

MILTON KAUFMAN, *Primary Examiner.*

F. D. SHOEMAKER, *Assistant Examiner.*

U.S. Cl. X.R.

74—5.6, 5.7